United States Patent [19]

Breher

[11] 4,268,471

[45] May 19, 1981

[54] METHOD OF PRODUCING A REINFORCED ENDLESS TOOTHED BELT OF SYNTHETIC PLASTICS MATERIAL HAVING A MINUS TOLERANCE OF THE BELT CIRCUMFERENTIAL LENGTH

[75] Inventor: Rudolf Breher, Porta Westfalica, Fed. Rep. of Germany

[73] Assignee: Breco Kunststoffverarbeitungs-GmbH & Co. KG, Porta Westfalica, Fed. Rep. of Germany

[21] Appl. No.: 152,730

[22] Filed: May 23, 1980

[30] Foreign Application Priority Data

May 23, 1979 [DE] Fed. Rep. of Germany ...... 2920916

[51] Int. Cl.³ ............... B29C 6/00; B29C 7/00; B29F 1/00
[52] U.S. Cl. ........................... 264/229; 264/231; 264/250; 264/259; 264/275; 264/279; 264/328.1; 264/334
[58] Field of Search ............ 264/173, 174, 255, 250, 264/328.1, 328.3, 229, 231, 281, 138, 157, 259, 252, 159, 251, 254, 275, 279, 261, 263, 334; 425/113, 115, 373, 111, 101, 130, 134, 129 R

[56] References Cited

U.S. PATENT DOCUMENTS

| | | | |
|---|---|---|---|
| 2,422,266 | 6/1947 | Steinke | 264/231 |
| 3,103,703 | 9/1963 | Ludenig | 264/275 |
| 3,634,572 | 1/1972 | Richmond et al. | 264/231 |
| 3,793,426 | 2/1974 | Ritchie | 264/231 |
| 3,803,281 | 4/1974 | Fix | 264/229 |
| 3,880,558 | 4/1975 | Breher et al. | 425/113 |
| 4,000,240 | 12/1976 | Green et al. | 264/229 |
| 4,018,641 | 4/1977 | Donaldson | 425/113 |
| 4,058,424 | 11/1977 | Breher | 425/113 |
| 4,083,838 | 4/1978 | Breher | 264/231 |

FOREIGN PATENT DOCUMENTS

2526691  6/1975  Fed. Rep. of Germany

*Primary Examiner*—W. E. Hoag
*Attorney, Agent, or Firm*—Becker & Becker, Inc.

[57] ABSTRACT

A method of producing an endless reinforced toothed belt of synthetic plastics material, the circumferential length of which in the untensioned condition has a predetermined minus tolerance in relation to an operationally tensioned intended circumference having the exact tooth pitch. The steps include placing on a molding wheel and a tensioning wheel a helically wound wire coil with fixed wire ends, the molding wheel and the tensioning wheel having an interaxial distance at which the wire coil has the minus tolerance in relation to the intended circumference. Then the wound wire coil is tensioned with elastic stretching of the wire turns and is enlarged to the intended circumference by increasing the interaxial distance to the intended distance. Then, with the molding wheel and the molding belt, a closed mold cavity is formed, and by injection of synthetic plastics material into the mold cavity beginning, a synthetic plastics strand of toothed-belt shape is produced in which the wire coil is embedded in the mold cavity. With one revolution of the wire coil, the synthetic plastics strand issuing from the mold cavity end is conducted back around the tensioning wheel into the mold cavity beginning, and in the mold cavity the beginning of the synthetic plastics strand is fused with its end.

3 Claims, 5 Drawing Figures

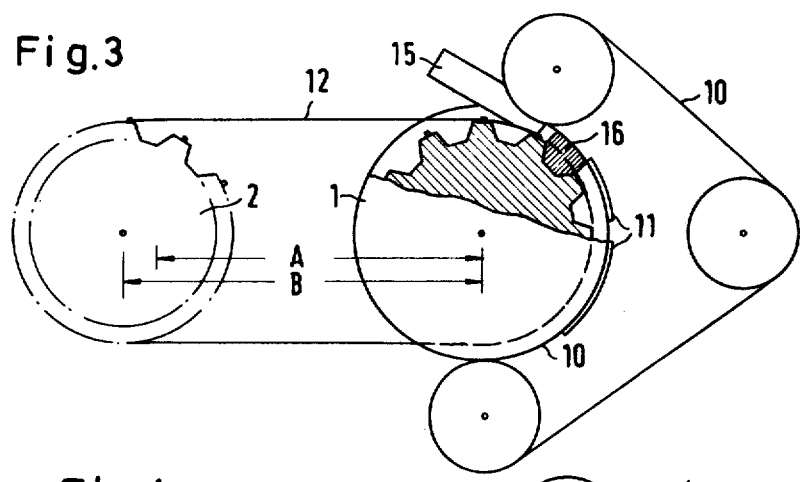
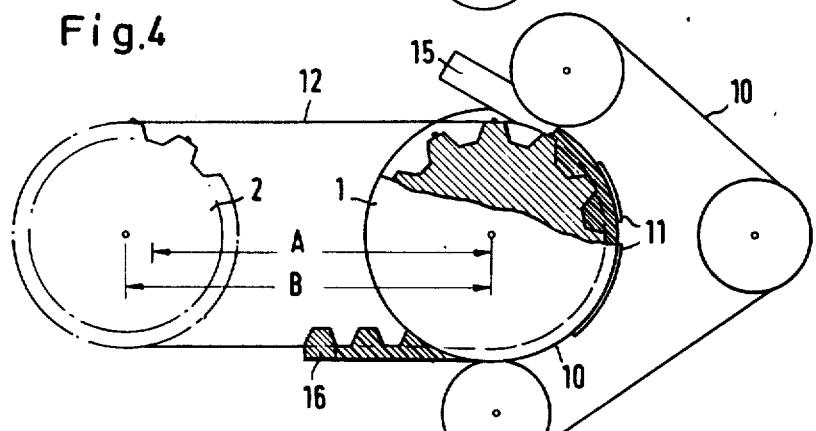
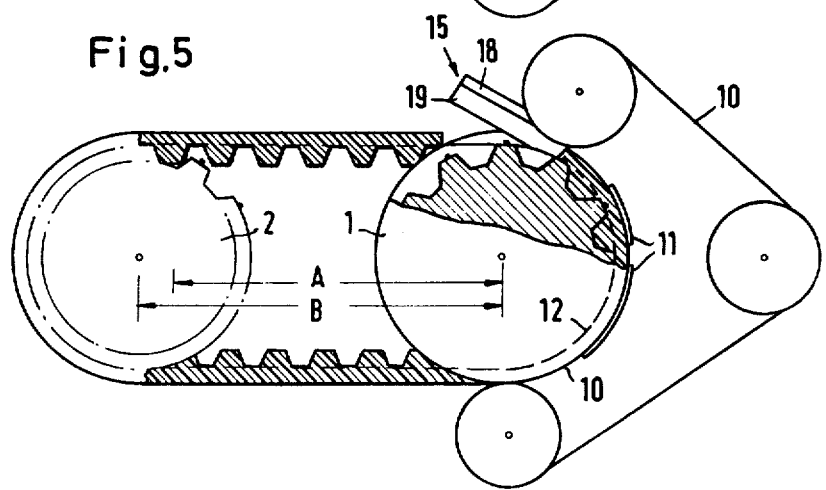

METHOD OF PRODUCING A REINFORCED ENDLESS TOOTHED BELT OF SYNTHETIC PLASTICS MATERIAL HAVING A MINUS TOLERANCE OF THE BELT CIRCUMFERENTIAL LENGTH

The present invention relates to a method of producing an endless toothed belt of synthetic plastics material or the like extrudable material, reinforced by a wire insert extending in the circumferential direction of the belt, with a minus tolerance of the belt circumferential length when the toothed belt is in the unstretched condition.

Synthetic plastics toothed belts which are endless, can have different circumferential lengths, and contain a reinforcing insert in the form of an embedded wire coil extending uninterruptedly in the circumferential direction, can be produced with the method known from German Pat. No. 25 26 691. The apparatus for this method comprises a molding wheel and a tensioning wheel, both of which have a circumference profiled in the manner of gear wheels. The distance between the molding wheel axis and the tensioning wheel axis is variable, so that the circumferential length of the toothed belt to be produced can be varied by even multiples of its tooth pitch. The molding wheel is surrounded over a part of its circumference of gear wheel profile by a covering which, over this circumferential part, together with the molding wheel, forms an arcuate mold cavity having a closed side edge and an open side edge. A synthetic plastics material and a reinforcing wire are introduced simultaneously into the beginning of the mold cavity at its closed side edge in order to form in the mold cavity a narrower synthetic plastics toothed belt-like strand with embedded reinforcing wire. The consolidated or set strand issuing from the end of the mold cavity is guided around the tensioning wheel and reintroduced into the mold cavity with lateral offsetting next to the point of introduction of synthetic plastics material and reinforcing wire. By continuous introduction of synthetic plastics material and reinforcing wire into the mold cavity, and continuous guiding of the formed reinforced strand around the molding wheel and the tensioning wheel, an inwardly toothed flexible hose with embedded wire coil is formed from the turns of the strand fused with one another in the mold cavity. The flexible hose closes the open lateral edge of the mold cavity and continuously issues from the mold cavity at this lateral edge. Toothed belts with the desired belt width are cut from the hose. The shaping of the synthetic plastics toothed belt in the form of the hose thus takes place together and simultaneously with the winding of the reinforcing wire on the molding wheel and the tensioning wheel, i.e. simultaneously with the formation of the wire coil. The toothing of the molding wheel shapes the desired tooth profile of the toothed belt to be produced, and has a tooth pitch which corresponds to the intended tooth pitch of the finished toothed belt. With regard to this intended tooth pitch, in the production of an endless toothed belt passing around the molding wheel and the tensioning wheel, the injection operation and the shaping of the synthetic plastics strand must take place with an intended distance, between the molding wheel axis and the tensioning wheel axis, which depends upon the tooth pitch to be produced. In the finished, untensioned condition, the toothed belt which can be produced with the known method consequently already possesses the intended tooth pitch necessary for operational co-operation with toothed wheels, and a circumferential length of the reinforcing insert which corresponds to the circumferential length of the wire coil determined and fixed during the winding of the reinforcing wire and simultaneous injection of the toothed synthetic plastics strand by the intended interaxial distance of the molding wheel and the tensioning wheel.

However, in practice it occurs that a toothed belt in operation with toothed wheels does not run untensioned, but must have a specific belt tension. Due to the belt tension, the reinforcing insert of the toothed belt stretches elastically and increases in circumference. This again has the consequence that the tooth pitch of the toothed belt becomes greater than the original intended tooth pitch present in the untensioned belt condition, which is the only condition in which the toothed belt can have the intended tooth pitch in the known method. Moreover, the toothed belt should possess the desired belt tension and should mesh satisfactorily, with the intended tooth pitch, with toothed wheels, even when in practice a plus tolerance or a minus tolerance is used in the interaxial distance of the toothed wheels, and correspondingly the requisite circumferential length of the toothed belt and of its reinforcing insert differs from that circumferential length which was determined by the intended interaxial distance between the molding wheel and the tensioning wheel during the production of the toothed belt. This intended distance in the known method, in view of the intended tooth pitch to be produced, cannot be increased or reduced by fractions of the intended tooth pitch.

Thus, the object of the present invention is to produce an endless reinforced toothed belt in such a way that in the unstressed belt the reinforcing insert lying in the neutral belt cross-sectional plane has a predetermined minus tolerance in the circumferential length, and the tooth pitch is smaller than the intended pitch, so that in the subsequent operationally stressed condition, stretched elastically by the minus tolerance, the toothed belt possesses both the desired belt tension and the necessary intended tooth pitch.

This object, and other objects and advantages of the present invention, will appear more clearly from the following specification in connection with the accompanying drawings, in which:

FIGS. 3 to 5 show the apparatus of FIG. 1 in different stages of the toothed belt formation from the beginning to the end of the injection operation.

Figure 1:
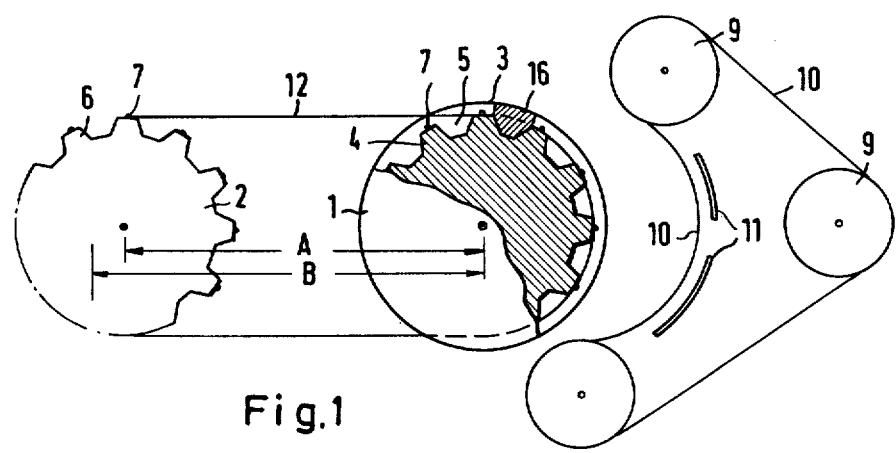
FIG. 1 is a side view of an exemplary apparatus for carrying out the method of the present invention.

The method according to the present invention is characterized primarily by the following method steps:

First, a wire coil wound helically from a reinforcing wire is applied to a molding wheel, the circumference of which is formed with an annular depression profiled in a gear wheel manner and corresponding in cross section to the toothed belt cross section to be produced, with which wheel there is associated a covering which can be laid upon a part of the mold wheel circumference and in this region closes the depression to form an arcuate mold cavity, and is applied to a tensioning wheel located at variable distance from the molding wheel and having a circumference profiled in a gear wheel manner; the interaxial distance of the molding wheel and the tensioning wheel is set below the intended distance in such a way that the circumferential length of the wire coil is smaller by a predetermined minus tolerance than the intended circumferential length of the wire insert in the toothed belt to be produced when the belt is in its tensioned condition.

After fixing the two wire ends of the wire coil against receding in their circumferential direction, the circumference of the wire coil is increased, accompanied by elastic stretching of the turns of the wire coil, to the intended circumferential length by increasing the interaxial distance of the molding wheel and the tensioning wheel to the intended distance; and with the wire coil in the tensioned condition and the mold cavity closed, the wire coil is turned through one revolution by rotating the molding wheel and the tensioning wheel, and from the beginning to the end of this revolution the synthetic plastics material is introduced into the beginning of the mold cavity, and the beginning of the synthetic plastic strand which re-enters the beginning of the mold cavity is fused with its end, whereupon the distance between the mold wheel and the tensioning wheel is shortened and the finished endless toothed belt, which contracts by relaxation of the embedded reinforcing insert, is stripped axially from the mold wheel and the tensioning wheel.

Thus, in the method according to the present invention, there occurs initially only the formation of the complete wire coil, around the molding wheel and the tensioning wheel, at an interaxial distance of the molding wheel and the tensioning wheel which falls short by a predetermined amount of the intended distance. The injection operation, that is, the actual production and shaping of the synthetic plastics toothed belt, takes place only after subsequent tensioning of the wire coil to the zero tolerance in the circumferential length, with the wire coil in an initially tensioned condition corresponding to the subsequent desired operational belt tension, and with the intended interaxial distance, between the molding wheel and the tensioning wheel, which is necessary for the intended tooth pitch to be produced. Since the wire coil is initially wound with normal slackness with the predetermined minus tolerance in the circumferential length, and the finally wound wire coil is then tensioned as a whole, a uniform tension occurs in all wire turns of the wire coil. After termination of the production of the belt, the initially tensioned wire coil returns to the untensioned condition and, in doing so, contracts the synthetic plastics material. In the untensioned condition then, the finished toothed belt has a neutral circumferential length which is less than the intended circumferential length by the minus tolerance predetermined in production, and also has a tooth pitch falling short of the intended tooth pitch. When the toothed belt is tensioned during operation and is stretched by the minus tolerance to the intended circumferential length, the toothed belt has not only the desired operational belt tension, but again also the intended tooth pitch necessary for exact meshing with gear wheels.

The wire coil can be prefabricated with a minus tolerance in the circumferential length on a separate winding reel, and can then be laid upon the molding wheel and the tensioning wheel with the aid of auxiliary clips which hold the turns of the wire coil together at the distance as wound. In this case, the two ends of the wire coil can be detachably secured on the winding reel in a web-like lock which is transferred together with the wire coil onto the molding wheel and is inserted into a tooth groove of the molding wheel in order to hold the wire ends fast during the elastic tensioning of the wire coil. This lock, insertable into a tooth groove of the molding wheel, can then at the same time be formed as a filler piece in such a way that it co-operates in a sealing manner with the molding belt and closes the mold cavity in a sealing manner, at the start of the injection operation, in the direction of rotation of the molding wheel. After the emergence of the lock from the mold cavity, the end of the latter is closed by the solidified synthetic plastics material, and the lock can be removed from the wire coil. The separate prefabrication of the wire coil makes it possible that during the further processing of a wire coil transferred onto the molding wheel and the tensioning wheel, the next wire coil can already be prefabricated on the winding reel for the next toothed belt to be produced.

The wire coil can also be wound directly on the molding wheel and the tensioning wheel, as will be described below by reference to the illustrated exemplary embodiment. Here the procedure in accordance with the invention, using a mold cavity having an open lateral edge, also permits intermittent production of a hose from which toothed belts can be cut with the desired belt width. In this case, for example the initial section of a wire coil can be wound and the initial section of the hose can be injected with this initial section of the wire coil in the tensioned condition. Then, with the interaxial distance of the molding wheel and the tensioning wheel shortened again, whereby the initial section of the hose is first relaxed, the next section of the wire coil is wound, with the initial section of the hose travelling out of the open side edge of the mold cavity. The wound next section of the wire coil is then tensioned, with the edge of the initial section of the hose adjoining the next section of the wire coil likewise being tensioned again, and during the surrounding of the next wire coil section by injection, this initial section edge closes the open side edge of the mold cavity and at the same time is fused together with the next section of the hose.

Referring now to the drawings in detail, the apparatus comprises a molding wheel 1 and a tensioning wheel 2. In conformity with the belt cross section and the tooth profile of the toothed belt to be produced, the molding wheel 1 has an annular depression with teeth 4 and tooth gaps 5 between lateral shoulders 3. The tensioning wheel 2 also has corresponding teeth 6. On the tip surfaces of the teeth 4 of the molding wheel 1, there are arranged narrow flange-like winding noses 7 which support the reinforcing insert of the toothed belt, formed by a wire coil 12, in its production at a specific radial distance from the tip surfaces of the teeth 4, on the one hand so that the turns of the wire coil can subsequently be completely enveloped with synthetic plastics material, except for the nearly punctiform support point, and on the other hand so that the reinforcing insert lies exactly in the neutral cross-sectional plane of the toothed belt to be produced. The teeth 6 of the tensioning wheel 2 are expediently also provided with similar winding noses 7. So that the turns of the wire coil 12 are uniformly spaced from one another and do not shift laterally during the injection of the toothed belt, the winding noses 7 are provided with notches 8 (FIG. 2), into which the turns of the wire coil place themselves. The annular depression of the molding wheel 1 is closable to form an arcuate mold cavity by a covering which co-operates with a part of the circumference of the molding wheel. This covering comprises an endless molding belt 10 which is guided over rollers 9 and can be laid in a sealing manner upon the shoulders 3 of the molding wheel 1, or can be lifted away from the molding wheel 1. By means of a heating and cooling apparatus 11, the mold cavity can be heated at its starting region and cooled at its end region to promote the synthetic plastics injection operation. The interaxial distance between the molding wheel 1 and the tensioning wheel 2 is variable, so that endless toothed belts can be produced with different desired circumferential lengths.

Figure 2:
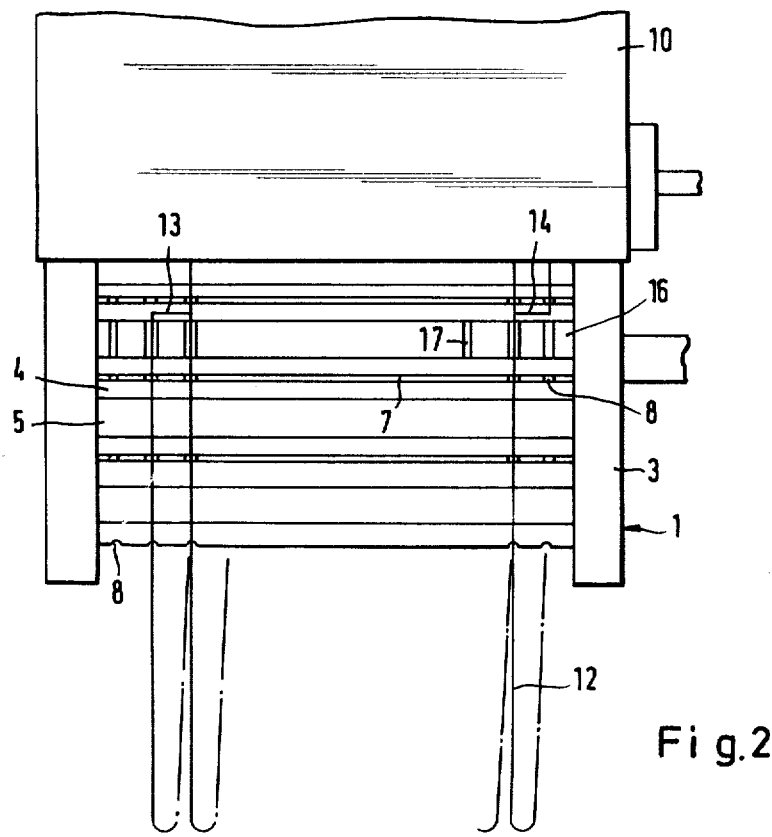
FIG. 2 is a plan view of a part of the apparatus of FIG. 1.

First, the wire coil 12 is formed on the molding wheel 1 and the tensioning wheel 2 by normal slack winding of a reinforcing wire. The interaxial distance of the molding wheel 1 and the tensioning wheel 2, which must have the intended value B for the synthetic plastics injection operation with regard to the intended tooth pitch to be produced (FIG. 1), is reduced to the distance A in such a way that during winding, the wire coil 12 receives a circumference which is less by a predetermined minus tolerance than the intended circumference of the coiled wire insert in the toothed belt to be produced when the latter is tensioned and stretched to the desired operational belt tension. In order to fix the ends of the wire coil against receding in the circumferential direction of the wire coil when the wire coil is tensioned in the course of the toothed belt production according to the invention, the wire ends can, for example, be connected with the adjacent turn of the wire coil by solder joints 13 and 14 (FIG. 2). The production of the wire coil 12 with the interaxial distance A can then take place as follows.

All notches 8 of the winding noses 7 lie on circles, as may be seen from FIG. 2. A reinforcing wire is fed to the molding wheel 1 in such a way that it always enters next to the right molding wheel shoulder 3 in FIG. 2 into the first circle of notches. The beginning of the wire is first brought back, after passing around the tensioning wheel 2, to the second circle of notches and is connected by the starting solder joint 13 with the wire lying in the first circle of notches. Then the molding wheel 1 and the tensioning wheel 2 are rotated, whereby the wire starting end, which is held fast by the starting solder joint 13 at the interval of the notch circles, enters of its own accord into the third and further notch circles until the wire starting end arrives, for example, in the penultimate notch circle next to the left molding wheel shoulder 3 in FIG. 2. The wire end of the wound wire coil 12 is then connected by the final solder joint 14 with the adjacent wire turn. In place of soldering the wire ends to the coil, other suitable measures can also be utilized to prevent yielding of the coil ends in the coil circumferential direction during tensioning of the wound wire coil. For lateral guidance of the wire coil turns on the winding noses 7, in place of the notches 8 a comb-like guide piece can be provided which is arranged on the side co-operating with the molding wheel of a nozzle mouthpiece of a synthetic plastics extruder which is to be connected to the beginning of the mold cavity.

The wire coil 12, wound with the minus tolerance in circumferential length, is then tensioned by enlargement of the interaxial distance of molding wheel 1 and tensioning wheel 2 to the intended distance B, accompanied by elastic stretching of the turns, and is enlarged in circumference to the intended circumference which the reinforcing insert has in the finished toothed belt at the desired operational belt tension. With this controllable tensioning of the entire wire coil after the winding operation, a uniform tensioning occurs in all turns. With the wire coil 12 in this condition tensioned to the zero tolerance in circumferential length, the mold cavity is now closed by approach of the molding belt 10 to the molding wheel 1 (FIG. 3). Furthermore, a mouthpiece 15 of an extruder, co-operating in a sealing manner with the molding wheel and the molding belt, is attached to the beginning of the mold cavity; the injection of the synthetic plastics material into the beginning of the mold cavity is now commenced. So that the mold cavity is closed in the direction of rotation of the molding wheel at the beginning of the injection operation, and an injection pressure necessary for the complete filling of the mold cavity can be applied, before the winding of the wire coil around the molding wheel and the tensioning wheel, a filler piece 16 was inserted into a tooth gap 5 of the molding wheel 1. The filler piece protrudes from the tooth gap and co-operates in a sealing manner with the molding belt 10 and has slottings 17 (FIG. 2) into which the turns of the wire coil fit. This filler piece 16 can also be formed as a lock, in which the ends of the wire coil are held fast by means of clamping screws or the like, for example if the wire coil is prefabricated on a separate winding reel and is laid from this reel together with the lock upon the molding wheel and the tensioning wheel. At the beginning of the injection operation, the plasticised synthetic plastics material is introduced into the cavity between the nozzle mouthpiece 15 and the filler piece 16. The injection operation and the shaping of the toothed belt take place with the intended distance B between the molding wheel axis and the tensioning wheel axis necessary with regard to the intended tooth pitch of the toothed belt to be produced. During the rotation of the molding wheel and the tensioning wheel, the synthetic plastics material introduced in the liquid state sets, and the end of the mold cavity is closed by the issuing strand of synthetic plastics material. The wire starting end and the wire end of the wire coil are anchored in the set synthetic plastics strand, so that after emergence from the mold cavity (FIG. 4), the filler piece 16 can be removed from the wire coil 12.

The beginning of the synthetic plastics strand or of the molded toothed belt is guided around the tensioning wheel 2 and drawn by the wire coil 12 into the start of the mold cavity, so that the start and the end of the synthetic plastics strand are cast to one another and the shaping of the endless toothed belt is terminated on rotation of the wire coil 12 by one revolution. During this one revolution, the wire coil shifts axially on the molding wheel and the tensioning wheel by one turn pitch of the wire coil. This turn pitch, that is, the distance between two turns of the wire coil, as a rule in reinforced toothed belts is so small, for example of the order of magnitude of about 1 mm, that the lateral shift of the start of the synthetic plastics strand occurring by only this slight amount is of no importance, and the start of the synthetic plastics strand can readily be reintroduced or drawn into the beginning of the mold cavity for casting with the end of the synthetic plastics strand. In order to facilitate the fusing together of the beginning and end of the synthetic plastics strand in the beginning of the mold cavity, the beginning of the synthetic plastics strand can be pre-heated and softened shortly before its re-entry into the mold cavity by suitable heating means or devices, whereby the reintroduction of the beginning of the synthetic plastics strand into the mold cavity, laterally staggered by one turn pitch, is also facilitated.

The nozzle mouthpiece 15 is provided with an upper part 18 (FIG. 5), which co-operates in a sealing manner with the molding belt 10, and a lower part 19 which closes that clear cross section of the mold cavity beginning which corresponds to the cross section of the back of the toothed belt. During the rotation of the molding wheel 1, the lower part 19 always co-operates in a sealing manner with at least one molding wheel tooth 4, so that no synthetic plastics material can escape backwards through the molding wheel tooth gaps 5. This lower part 19 of the nozzle mouthpiece 15 is made retractable, and the injection passage of the nozzle mouthpiece 15, guided through the upper part 18 and the lower part 19, is preferably blocked by retraction of this lower part 19, in order to block off further inflow of synthetic plastics material into the beginning of the mold cavity when the lower part 19 is in the retracted position. Shortly before the re-introduction of the start of the synthetic plastics strand into the mold cavity, the lower part 19 of the nozzle mouthpiece 15 is retracted, so that the belt back of the start of the synthetic plastics strand can be introduced into the beginning of the mold cavity. After entry of the beginning of the synthetic plastics strand into the mold cavity, first the beginning of the strand is seamlessly fused with the end of the strand by heating by means of the device 11, and the connection is consolidated or set by cooling by means of the device 11. Next, the distance between the molding wheel axis and the tensioning wheel axis is shortened, and the finished endless toothed belt, which then contracts by relaxation of the reinforcing inset 12 to the belt circumferential length with the minus tolerance, is taken from the molding wheel and the tensioning wheel. The edges of the finished toothed belt can then be finished by clean cutting away, for example in order to also remove the initial solder joint 13 and the final solder joint 14. The finished toothed belt contains a coiled or helical reinforcing insert uninterrupted in the circumferential direction and terminating at the two belt edges. A toothed belt ring with narrower desired belt width can be cut off by a cut in the circumferential direction which severs the wire coil at one point.

The present invention is, of course, in no way limited to the specific disclosure of the drawings and specification, but also encompasses any modifications within the scope of the appended claims.

What I claim is:

1. A method of producing an endless toothed belt which is made of synthetic plastics material or similar extrudable material and is reinforced by a wire insert which extends in the circumferential direction of said belt and exists with a minus tolerance of the belt circumferential length when said belt is in the unstretched state, said method comprising the steps of:
    providing a molding wheel, the circumference of which is provided with an annular depression which is profiled in a gear wheel manner and corresponds in cross section to the cross section of the belt to be produced, covering means associated with said molding wheel and being placeable upon a portion of the circumference thereof for closing said depression in the region of this portion to form an arcuate mold cavity;
    providing a tensioning wheel locatable at a variable distance from said molding wheel and having a circumference profiled in a gear wheel manner;
    providing a wire coil helically wound from a reinforcing wire;
    placing said wire coil on said molding wheel and said tensioning wheel after setting the interaxial distance between said molding wheel and said tensioning wheel below the intended distance in such a way that the circumferential length of said wire coil is smaller by a predetermined minus tolerance than the intended circumferential length of said wire insert in the belt to be produced when the latter is in its tensioned state;
    fixing said wire coil in position to prevent receding of any portion thereof in the circumferential direction of said coil;
    increasing the interaxial distance between said molding wheel and said tensioning wheel to the intended distance to increase the circumference of said wire coil, accompanied by elastic stretching of the turns of said wire coil, to the intended circumferential length to thus place said wire coil in a tensioned state;
    closing said depression with said covering means to form said mold cavity;
    turning said wire coil through one revolution by rotating said molding wheel and said tensioning wheel;
    introducing synthetic plastics material or similar extrudable material into the beginning of said mold cavity throughout said wire coil revolution to form a material strand;
    fusing the beginning of said material strand with the end thereof as said strand beginning starts to re-enter the beginning of said mold cavity at the conclusion of said wire coil revolution;
    hardening said material;
    shortening the interaxial distance between said molding wheel and said tensioning wheel to relax the embedding reinforcing insert and thereby contract the finished endless toothed belt; and
    axially stripping said endless belt from said molding wheel and said tensioning wheel.

2. A method according to claim 1, which includes the steps of:
    prewinding said wire coil, with said minus tolerance in the circumferential length thereof, on a winding reel which can provide different winding circumferences;
    fixing the length of said wire coil with at least one detachable lock which corresponds in cross section and length to a tooth of the toothed belt to be produced, and is removable from said reel;
    removing said wire coil and lock from said reel;
    placing said wire coil on said molding wheel and said tensioning wheel by inserting said lock into a gap between teeth on the circumference of said molding wheel at the beginning of said mold cavity prior to said step of increasing said interaxial distance;
    after said closing step, sealingly connecting an extrusion nozzle at the beginning of said mold cavity for introducing said material thereto between said nozzle and said lock; and
    after starting said introducing step, and prior to completion of said wire coil revolution, removing said lock from said wire coil.

3. A method according to claim 2, which includes the steps of providing an extruder with a mouthpiece, providing said mouthpiece with a portion which during said closing step sealingly cooperates with said covering means and said molding wheel at the beginning of said mold cavity, after completion of said introduction step and prior to said fusing step, bringing the beginning of said material strand to said mouthpiece, retracting that portion of said mouthpiece which cooperates with said molding wheel, opening that cross-sectional part of said mold cavity which corresponds to the cross section of the back of the toothed belt to be produced, and introducing the beginning of said material strand into said mold cavity in such a way that its back surface sealingly cooperates with said retracted mouthpiece portion.

* * * * *